G. H. FELT.
Blasting Plug.

No. 52,836.

Patented Feb. 27, 1866.

Witnesses
Henry G. Pearson
William A. Lambert

Inventor:
Geo. H. Felt

UNITED STATES PATENT OFFICE.

GEORGE H. FELT, OF NEW YORK, N. Y.

IMPROVED PLUG FOR BLASTING.

Specification forming part of Letters Patent No. 52,836, dated February 27, 1866.

*To all whom it may concern:*

Be it known that I, GEORGE H. FELT, of the city, county, and State of New York, have invented a new and useful Improvement in Plugs for Blasting and other Purposes; and I do hereby declare that the following is a full, clear, and exact description of the same, reference being had to the accompanying drawings, forming part of this specification.

This invention is more especially designed for blasting and analogous purposes.

It consists in the application to or within the hollow to be plugged of one or more cylinders of vulcanized rubber or other similar material, which are expanded by means of nuts and screws operating on washers and the heads of the bolts passed through the said cylinders of rubber, the bolts acting separately on the said cylinders of rubber.

To enable others skilled in the art to make and use my invention, I will proceed to describe its construction and operation.

Figure 1:
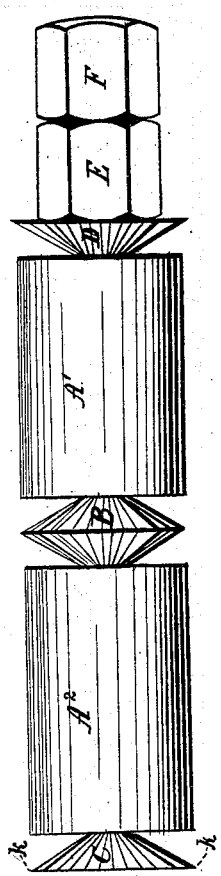
Figure 2:
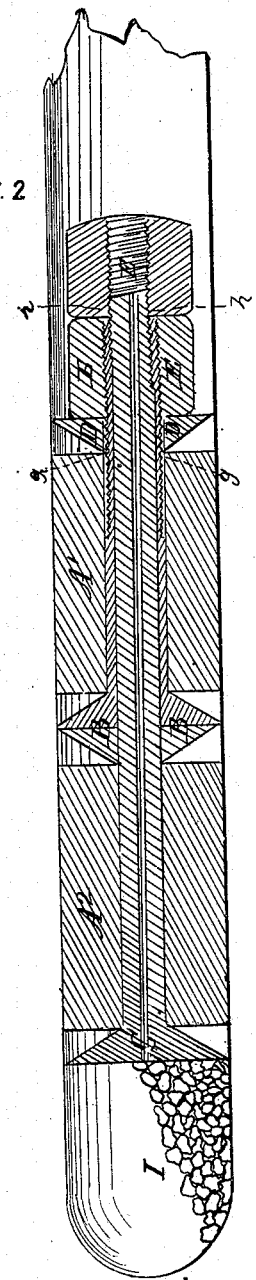

Figure 1 in the drawings is an elevation, and Fig. 2 is a longitudinal sectional view, of the plug.

Similar letters of reference indicate corresponding parts in the several figures.

$A'$ and $A^2$ are cylinders of rubber or similar material to be expanded; B, the tube by which the cylinder $A'$ is expanded by the nut E working on the screw $g$ and pressing on the washer D; C, the bolt by which the cylinder $A^2$ is expanded by the nut F working on the screw $h$, the head of the tube B acting as washer.

The action of this plug is as follows: Being inserted in the hole to be plugged, the upper section, $A'$, is expanded by the nut E until it presses with sufficient force against the side of the hole. The rubber $A'$ being an elastic body, the pressure on the ends of the cylinder is multiplied by the surface of the sides of the cylinder, so that with a pressure of one hundred pounds on the ends of the cylinder (1.5 diameter, 1.77 area × 100 pounds) the pressure on the sides of the cylinder will be equal to 100 pounds × 9.4236, (1.5 diameter, 2 inches long.) The cylinder $A'$ being secured in position, the nut F and screw $h$ act in the same manner upon the cylinder $A^2$. Upon the explosion of the powder I the head of the bolt C is driven against the cylinder $A^2$, which it expands laterally, producing an increased outward pressure, as above described, and the bolt C not being connected with the tube B, but passing freely through it, the cylinder $A'$ is not affected by the explosion of the powder, but acts as a shoulder for the cylinder $A^2$ to operate against.

The fuse passes through the center of the bolt C, or the charge can be fired in any other manner.

The greater the force of the powder against the plug the tighter it will be wedged in the hole.

The washers are made conical, which throws the rubber into the shape marked by the dotted lines $k$, and binds the ends of the rubber cylinders down on the washers and heads of the bolts.

The charge can be fired at any point by extending the inner tube, through which the fuse passes, to the desired point.

What I claim as my invention, and desire to secure by Letters Patent, is—

1. The combination of cylinders of vulcanized india-rubber or other similar material with screw-bolts or tubes acting separately and being detached, by means of which increased outward pressure is produced, substantially as and for the purposes herein specified.

2. Igniting the charge at any desired point by extending the inner tube within the charge or cartridge to the point desired, substantially as and for the purposes herein specified.

GEO. H. FELT.

Witnesses:
HENRY G. PEARSON,
WILLIAM H. LAMBERT.